United States Patent [19]

Icenogle et al.

[11] Patent Number: 4,957,121

[45] Date of Patent: Sep. 18, 1990

[54] MOBILE INTENSIVE CARE PATIENT HANDLING SYSTEM APPARATUS AND METHOD OF USING

[75] Inventors: Timothy Icenogle; William F. Machamer; Robert J. Nelson; Stephen Mikitish, Jr.; Robert R. Davis, all of Tucson, Ariz.

[73] Assignee: Arizona Technology Development Corporation, Tucson, Ariz.

[21] Appl. No.: 217,365

[22] Filed: Jul. 5, 1988

[51] Int. Cl.$^5$ .............................................. B64D 9/00
[52] U.S. Cl. .......................................... 128/897; 5/60; 244/118.5; 296/19
[58] Field of Search .................. 600/18; 128/845, 870, 128/897; 5/60, 81 R, 81 B, 503; 244/118.5; 280/640; 296/19, 20

[56] References Cited

U.S. PATENT DOCUMENTS

| | | | |
|---|---|---|---|
| 2,303,618 | 12/1942 | Couleur | 296/19 |
| 3,005,656 | 10/1961 | Fulton | 296/19 |
| 3,304,116 | 2/1967 | Stryker | 296/20 |
| 3,341,246 | 9/1967 | Lavallee | 296/20 |
| 4,115,884 | 9/1978 | Keogh | 296/19 |
| 4,225,153 | 9/1980 | Bez et al. | 296/19 |
| 4,352,991 | 10/1982 | Kaufman | 307/9 |
| 4,425,978 | 1/1984 | Star | 296/19 |
| 4,458,864 | 7/1984 | Colombo et al. | 244/118.5 |
| 4,483,499 | 11/1984 | Fronk | 296/19 |
| 4,584,989 | 4/1986 | Stith . | |
| 4,691,397 | 9/1987 | Netzer | 5/507 |
| 4,768,241 | 9/1988 | Beney | 5/60 |
| 4,783,025 | 11/1988 | Moffett | 244/118.5 |
| 4,783,105 | 11/1988 | Bucalo | 296/20 |
| 4,795,122 | 1/1989 | Petre | 5/503 |

OTHER PUBLICATIONS

Icenogle et al., Article "Long Distance Transport of Cardiac Patients in Extremis: The Mobile Intensive Care (MOBI) Concept", May, 1988 issue of Aviation, Space and Environmental Medicine.

Primary Examiner—Stephen C. Pellegrino
Assistant Examiner—Ralph Lewis
Attorney, Agent, or Firm—Victor Flores

[57] ABSTRACT

This invention discloses a mobile intensive care patient handling apparatus that includes a specially designed framework member, a pallet member for supporting the framework member while in a commerical aircraft, framework restraint brackets to secure the framework to the pallet member, pallet restraint brackets to secure the pallet member to seat rails provided on commercial aircraft, said framework member is provided with an undercarriage adapted for containing life sustaining medical equipment and further adapted for being secured to both the framework restraint brackets and a conventional ambulance's patient cot restraint brackets. The patient handling apparatus can be designed according to any aviation authorities' design requirements including, structural design requirements for emergency landing conditions, structural design requirements for gust load factors, hardware fastening, structural bonding, size and shape design requirements. The patient handling apparatus is especially designed to comply with the American Society of Hospital Based Emergency Air Medical Services standards and with the United States Federal Aviation Authority's (FAA) design requirements.

10 Claims, 6 Drawing Sheets

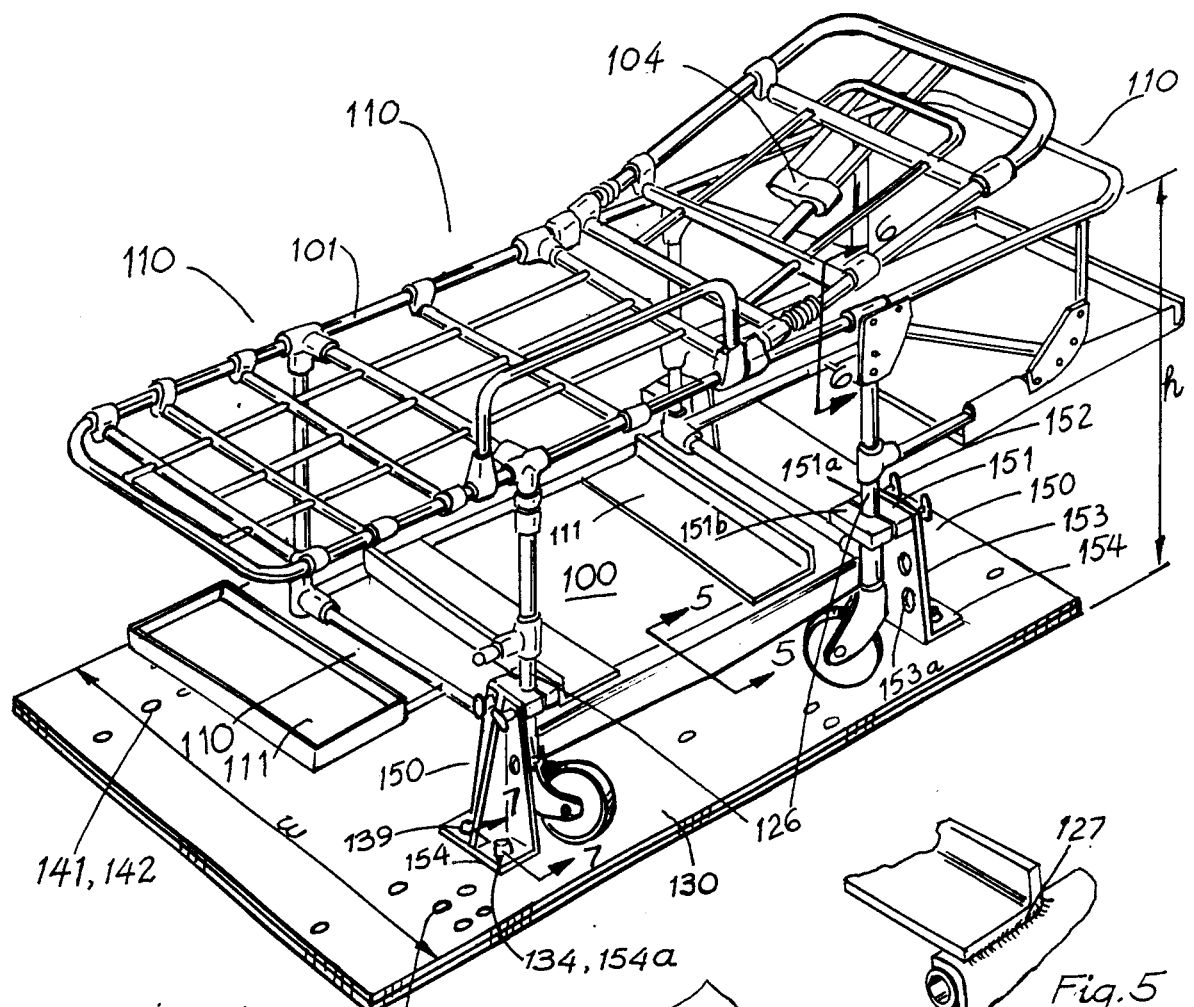
Fig. 4
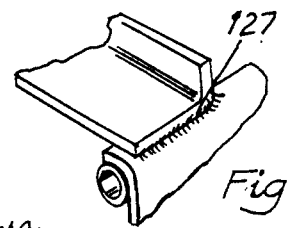
Fig. 5
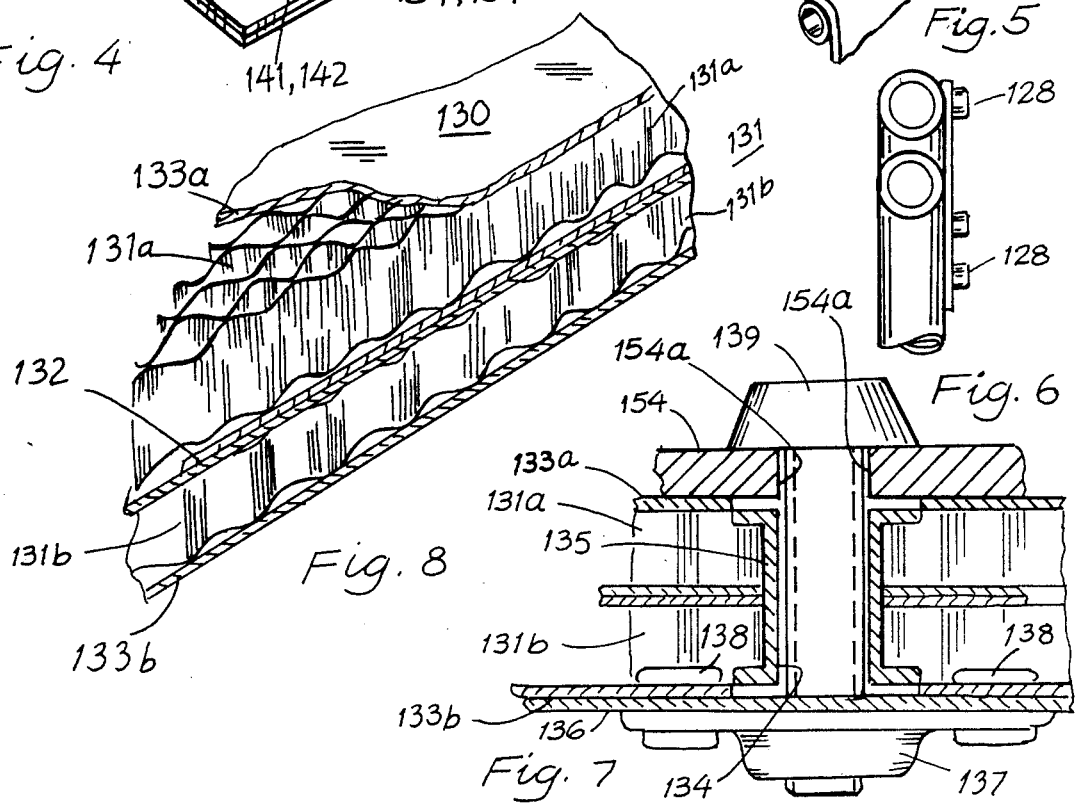
Fig. 8
Fig. 6
Fig. 7

MOBILE INTENSIVE CARE PATIENT HANDLING SYSTEM APPARATUS AND METHOD OF USING

FIELD OF THE INVENTION

This invention relates to patient transport system apparatuses and methods of using and more particularly to patient transport apparatuses adapted for compliance with an aviation authorities' design requirements and that provide uninterrupted intensive medical care to a critically ill patient while being transported via land, water or air, such as transporting a critically ill cardiac patient from a first hospital location to a remote second specialized medical treatment hospital using the same patient transport apparatus using conventional ambulances and a commercial aircraft adapted to receive the patient transport apparatus.

DESCRIPTION OF THE PRIOR ART

The clinical success of heart transplants has resulted in increasing referrals of patients in severe heart failure. The referral process of such critically ill patients has created a need for safe transportation from the patient's critically ill location to a remote and distant specialized medical treatment hospital location where special medical treatment, such as a heart transplant, may be performed. It is known that critically ill cardiac patients being transported have clinical demands that exceed the capabilities of presently known conventional land or air ambulance services. Conventional air and land ambulance services are frequently incapable of transporting these patients safely because sophisticated monitoring and support equipment is not present. Known methods of transporting critically ill patients are not uninterruptable because of stringent aviation authorities' equipment design requirements relating to emergency landing and gust load factors design criteria. These requirements prohibit using presently known patient transport apparatus continuously in conventional ground ambulances and on aircraft. These requirements have resulted in medical facilities having to purchase and maintain a permanently modified aircraft provided with the needed life sustaining medical equipment and have assumed the risks on a patients safety while transferring the patient from one transport appararatus in a ground ambulance, or from specialized ground mobile intensive care unit to the specially modified intensive care system in the aircraft. The cost to maintain such a system is viewed as prohibitive in most cases. The costs associated with maintaining a dedicated ground mobile intensive care unit ranges from $300,000 to $500,000 while the costs to maintain a dedicated flying intensive care unit ranges from $800,000 to $1,200,000 for the purchase of the plane plus $50,000 to $150,000 to retrofit the intensive care equipment plus cost of $30,000 to maintain the equipment and provide trained personnel. An alternative patient transport system is needed to solve the cost problem and to minimize the risks to a patient's during the transferring of care services.

Known patented apparatuses that have attempted to solve the problem but have not been commercially successfully includes the following patents:

U.S. Pat. No. 4,584,989 discloses a life support stretcher bed adapted to accommodate patients in intensive or cardiac care units in hospitals. The life support stretcher bed is broadly adapted for electrical medical devices, medical supplies and implements and features an undercarriage including a support structural, wheels, a patient platform with mattress, an electrical power source arrangement and support vans for mounting the medical equipment.

U.S. Pat. No. 4,352,991 teaches a life support system adapted for field use in a vehicle with available power and includes broadly, electrically operable life support units, means for supporting the life support units and a patient stretcher, a dc power source adapted for battery or remote power source.

U.S. Pat. No. 4,691,397 teaches a device for carrying the life supporting devices of a bedridden patient including a tablelike means for supporting the devices, an iv holder means, wheeled transport means and a hospital bed foot board securing means.

U.S. Pat. No. 3,304,116 teaches a multiple purpose wheeled carriage capable of supporting a stretcher carrying a patient, adapted with four castered wheels, a fifth wheel, a rectangular frame, a fluid pressure actuated means for vertical adjustment, operating and control means and patient support means.

U.S. Pat. No. 3,341,246 teaches a hospital stretcher adapted broadly with a litter structure having telescopic post elements and other means for manipulating the patient to various positions.

Although the prior art teaches mobile intensive care patient transport apparatuses, the prior art does not teach a patient transport apparatus adapted for continuous, interrupted use on both conventional ground ambulances and commercial aircraft with minor modifications. Therefore, the need is seen to exist for a mobile intensive care apparatus that can be used to transport a critically ill patient, such as a cardiac patient, without interrupting the patient's clinical need throughout the transportation process involving conventional ground ambulances and commercial aircraft.

SUMMARY OF THE INVENTION

Accordingly, the primary object of the present invention is to solve these deficiencies in the prior art by providing a mobile intensive care patient transport apparatus that will provide uninterrupted medical services to a critically ill patient, such as a cardiac patient, while being transported from one hospital location to a distant hospital location via a combined use of conventional ground ambulances and conventional, commercial aircraft temporarily modified to provide the service.

It is another object of the invention to provide a cost affordable alternative system of providing a land. air and water patient transport apparatus that complies with an aviation authority's design requirements.

It is still another object of the present invention to provide a facility having the present invention and an available staff of medically trained personnel to provide uninterrupted mobile emergency intensive care service to a critically ill patient, such as a cardiac patient, while being transported from one hospital location to a distant hospital location using conventional ground ambulance services and a temporarily modified commercial aircraft.

Accordingly, the present invention teaches a mobile intensive care patient handling apparatus, hereinafter mobi, comprising a specially designed framework means, a pallet means for supporting the framework means while in a commercial aircraft, framework restraint brackets to secure the framework to the pallet means, pallet restraint brackets to secure the pallet means to seat rails provided on commercial aircraft, said framework means provided with an undercarriage adapted for containing a plurality of life sustaining medical equipment and further adapted for being secured to both the framework restraint brackets and a conventional ambulance's patient cot restraint brackets. The mobi apparatus can be designed according to any aviation authorities' design requirements including, structural design requirements for emergency landing conditions, structural design requirements for gust load factors, hardware fastening, structural bonding, size and shape design requirements. The mobi apparatus is especially designed to comply with the American Society of Hospital Based Emergency Air Medical Services standards and with the United States Federal Aviation Authority's (FAA) design requirements.

The method includes the steps of using the mobi apparatus from a storage and maintenance facility, initially placing the critically ill patient on the mobi apparatus and the entire uninterrupted transportation process required to deliver the patient at the special medical treatment hospital.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

BRIEF DESCRIPTION OF THE DRAWINGS

FIG. 4 is a perspective view of the complete mobile intensive care patient handling apparatus illustrating the framework, the pallet member and the framework restraint brackets.

FIG. 5 is a sectional view taken along the line 5—5 in FIG. 4 illustrating a typical weld joint required by an aviation authority.

FIG. 6 is a sectional view taken along the line 6—6 in FIG. 4 illustrating a typical hardware connected joint required by an aviation authority.

FIG. 7 is a sectional view taken along the line 7—7 in FIG. 4 illustrating typical the reinforcement hardware required to adequately restrain the framework means to the pallet means to assure compliance with an aviation authority's design requirements.

FIG. 8 is a sectional perspective view of the pallet means illustrating the laminated honeycombed structure of the pallet means.

DESCRIPTION OF THE PREFERRED EMBODIMENTS

Figure 1:
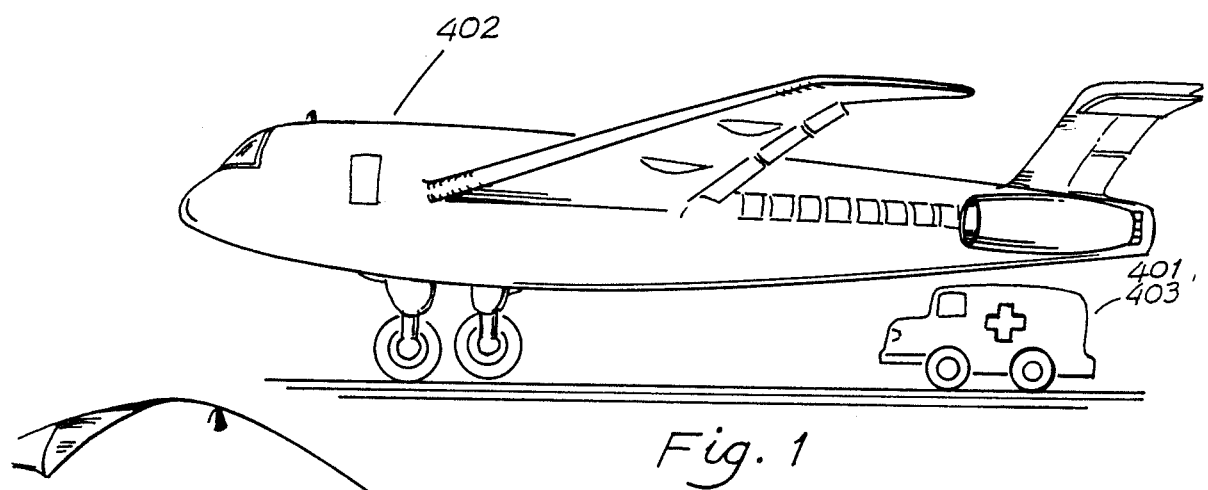
FIG. 1 is a perspective view of typical commercial aircraft and conventional ground ambulances that may be used with the present invention.
Figure 2:
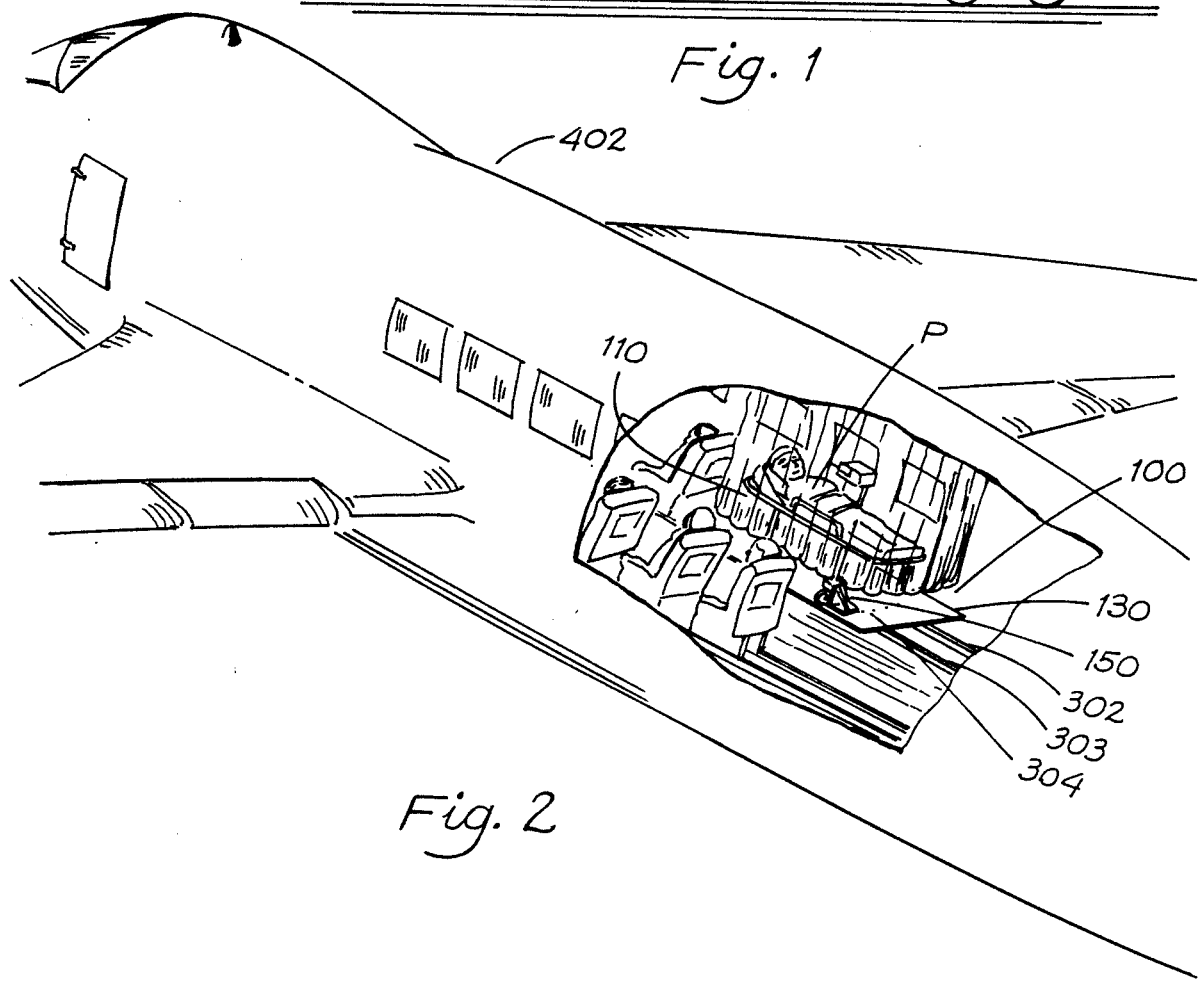
FIG. 2 is a perspective cutaway view of a commercial aircraft illustrating the present invention in use.
Figure 3:
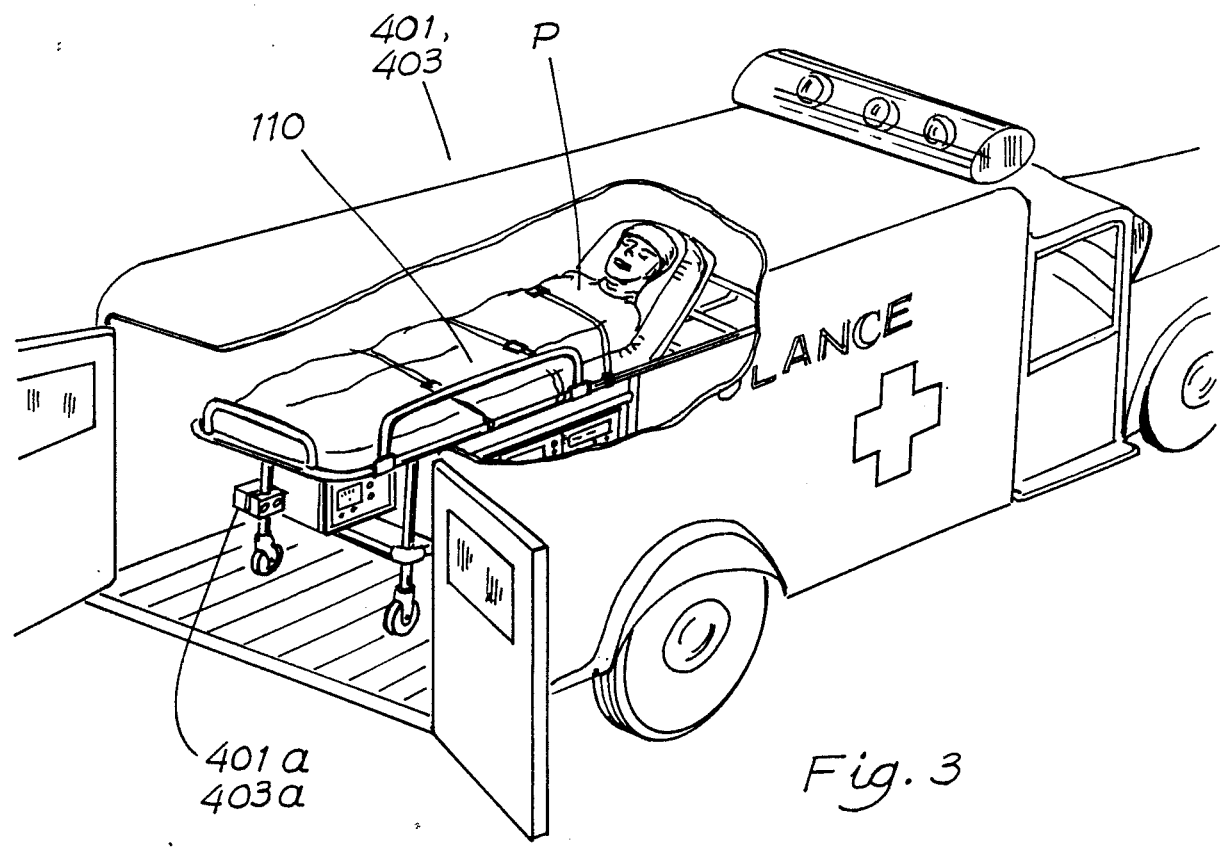
FIG. 3 is a perspective cutaway view of a conventional ground ambulance illustrating the present invention in use.

FIGS. 1, 2 and 3 shows the typical commercial aircraft 402 and conventional ground ambulances 401, 403 (numerals indicative of a first and second ground ambulance at two hospital locations) for which the present invention can be adapted. FIG. 2 shows the present mobile intensive care apparatus (mobi) 100 temporarily installed on seat rails 302 and 303 of aircraft 402. The mobi 100 is shown to contain a patient P privately situated and properly restrained in a passenger compartment of a aircraft 402 by having framework 110 secured to pallet means 130 using framework restraint brackets 150 and pallet means 130 secured to seat rails 302, 303 using pallet restraint brackets 304. FIG. 3 illustrates using the same framework means 110 in conventional ground ambulances 401, 403 and being restrained using the same frame portion 126, see FIG. 4, attached to ambulance restraint brackets 401a and 403a.

Figure 11:
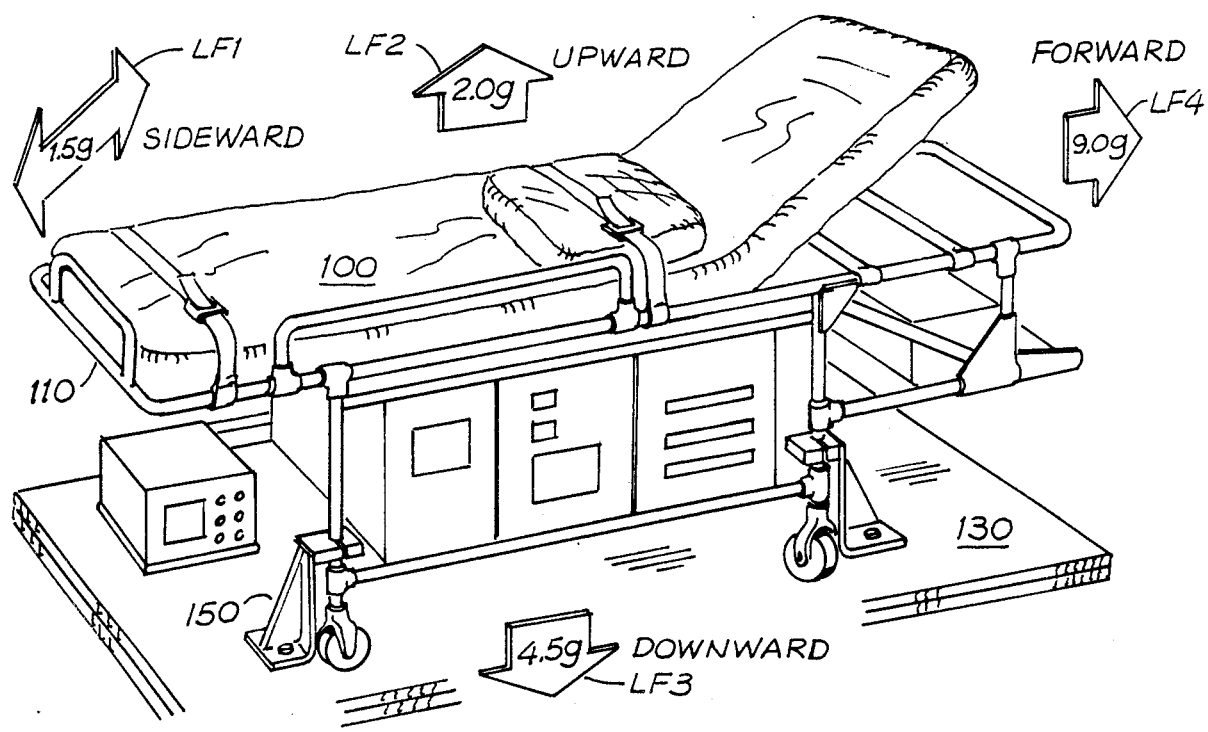
FIG. 11 is a perspective side view of the present invention illustrating the relationship of the gravitational forces to the apparatus that must be considered in designing the airworthy patient handling apparatus.

Referring now to FIG. 4 where the mobi 100 is shown being comprised of a framework 110 secured to pallet means 130 using framework restraint brackets 150. Framework 110 is preferably designed having a patient cot portion 101 with adjustment member 104 and an undercarriage compartment 111 for mounting a plurality of life sustaining medical equipment and a dual purpose frame restraint portion 126 for securing to the framework brackets 150 as well as to ambulance restraint brackets 401a and 403a. Framework restraint brackets 150 are designed for attachment to frame portion 126 by means of framework undercarriage mounting member 151, including a first and second framework undercarriage bracket members 151a and 151b and fastener 152. Brackets 150 are provided with a substantially vertical bracket portion 153 that connects to a pallet mounting member 154 provided with mounting holes 154a. Vertical bracket portion 153 is provided with pass thur holes 153a for providing routing of wiring, or the like towards the central portion of undercarriage 111. Pallet means 130 is designed having a reinforced, substantially rectangular sheet member 131 provided with at least one hole pattern 141 for mounting pallet means 130 to aircraft seat rails 302 and 303. It would also be productive to include a second hole pattern 142 for use on a second type of aircraft having a different dimensional arrangement of seat rails. Pallet means 130 is also provided with at least one hole pattern 134 for mounting said at least one framework means restraint bracket means 150. FIG. 4 shows pallet means 130 provided with four (4) set of hole patterns 134 for securing bracket 150 to pallet means 130. The aviation authority design requirements mandate height h and width w limitations to assure cabin conformance of a selected commercial aircraft. Also, the design of mobi 100 requires factoring into the design, emergency landing requirements, such as gravitational forces LF1, LF2, LF3 and LF4 as shown in FIG. 11. Similar requirements are mandated for compliance of gust loading factors. Compliance with these gravitational forces, requires a structural design that includes welded joints 127 as shown in FIG. 5 and hardware 128 connections as shown in FIG. 6 and sheet member 131 being comprised of adhesively laminated joint 132 of a pair of honeycombed panels 131a and 131b having an outer clad material 133a and 133b on each face, see FIG. 8. To assure proper structural pallet integrity in the hole patterns there is provided reinforcing bushings 135 in each hole of the hole pattern used for mounting the pallet means to the aircraft seat rails and in each hole pattern for mounting the framework means restraint bracket means portion 154 to pallet means 130, see generally FIG. 7. FIG. 7 shows in cross section, pallet sheet members 131a and 131b having mounting hole 134 for receiving a fastener 139 in the securement of bracket member 154 to a surface of outer clad materials 133a utilizing a back plate 136 and nut plate 137 mounted with rivets 138 to the surface of outer clad material 133b.

Figure 9:
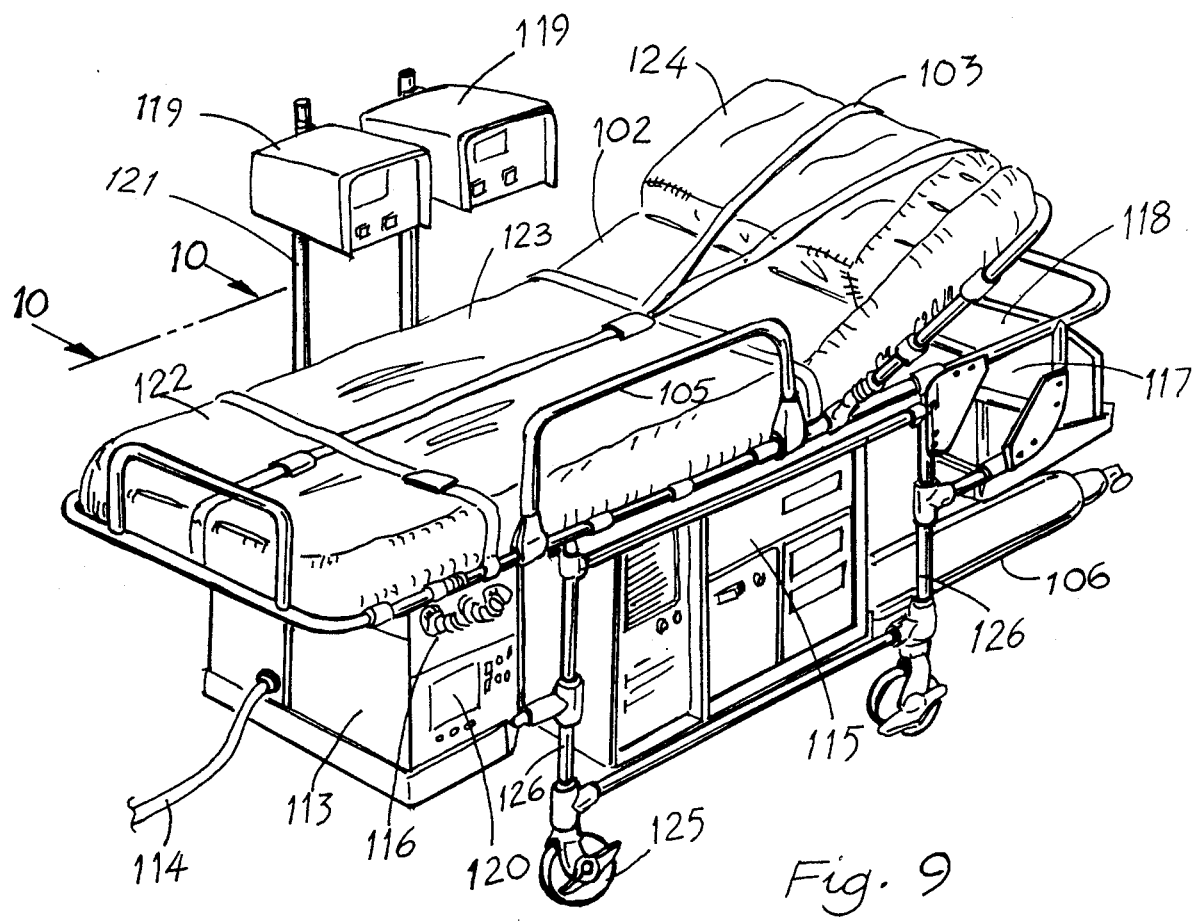
FIG. 9 is a perspective view of the present invention illustrated having a patient mattress installed and provided with patient restraint straps and life sustaining medical equipment in an undercarriage portion of the framework means.
Figure 10:
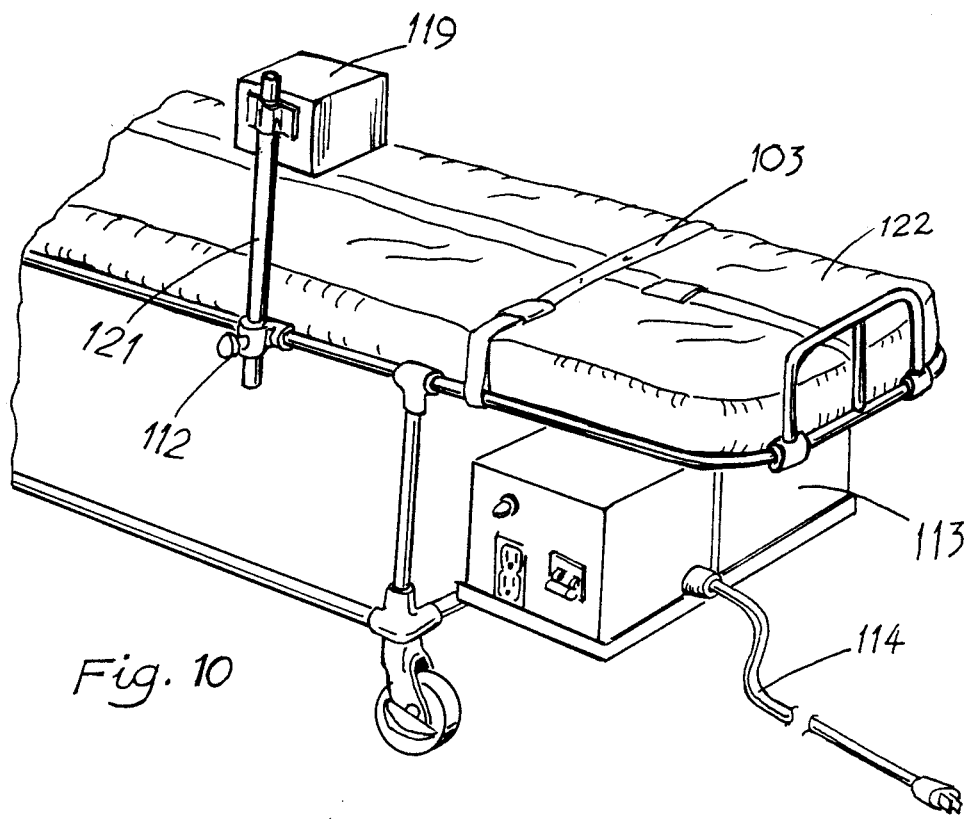
FIG. 10 is partial perspective side view of the present invention illustrated in FIG. 9.

FIG. 9 illustrates a populated framework 110 having patient cot portion 101 provided with a mattress 102 having patient restraint straps 103, side rails 105, foot, middle and head portions 122, 123 and 124, respectively and casters 125. The undercarriage compartment 111 is shown with a local power source 113 (internally generated, line drive or battery backup), having a power input cable 114 for receiving power from a hospital room, ambulance or aircraft power source, an intra-aortic balloon pump 115, a defibrillator 116, a ventilator 117, a pulse oximeter 118, infusion pumps 119, blood pressure monitors and ekg monitors 120 and pneumatic supplies 106. FIG. 10 show an opposite side of framework 110 and illustrates removable poles 121 secured with clamp 112.

Figure 12:
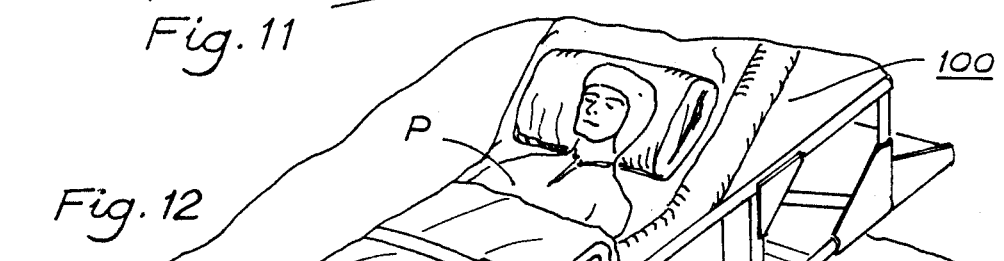
FIG. 12 is a partial perspective view illustrating an enlarge view of the in-use apparatus illustrated in FIG. 2, showing the pallet restraint brackets attached to the aircraft's seat rail.
Figure 13:
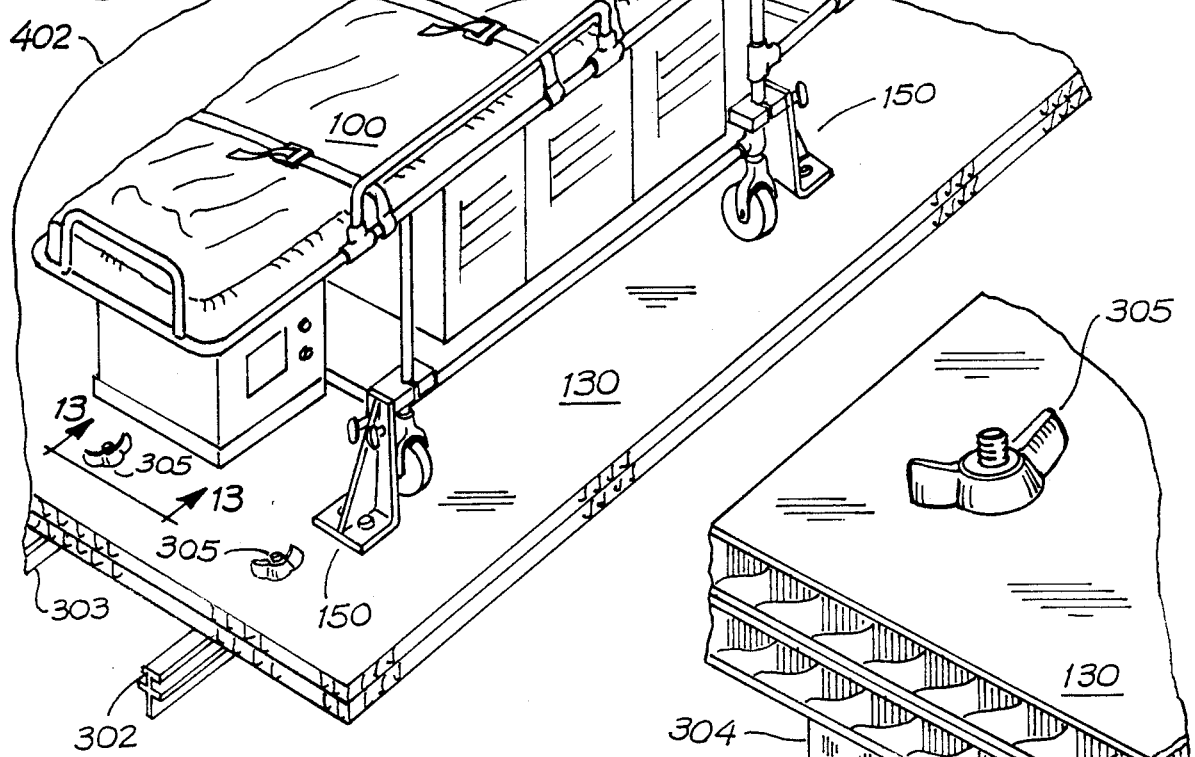
FIG. 13 is a partial end view of a mated aircraft seat rail with the pallet restraint brackets used to secure the pallet means and framework in an aircraft.

The use of commercial aircraft, such as LEARJET or CESSNA aircraft, in transporting of mobi 100 is facilitated by the mated bracket design of pallet restraint bracket 304 that is adapted for a mating engagement with an aircraft's seat rail 302, 303 design. FIG. 12 illustrates in a partial extracted view of an application of mobi 100 transporting a patient P in aircraft 402 and being attached to seat rails 303 and seat rails 302 using fastener 305 protruding through pallet means 130. FIG. 13 shows, typically, the mated engagement of pallet restraint bracket 304 with seat rail 303.

Figure 14:
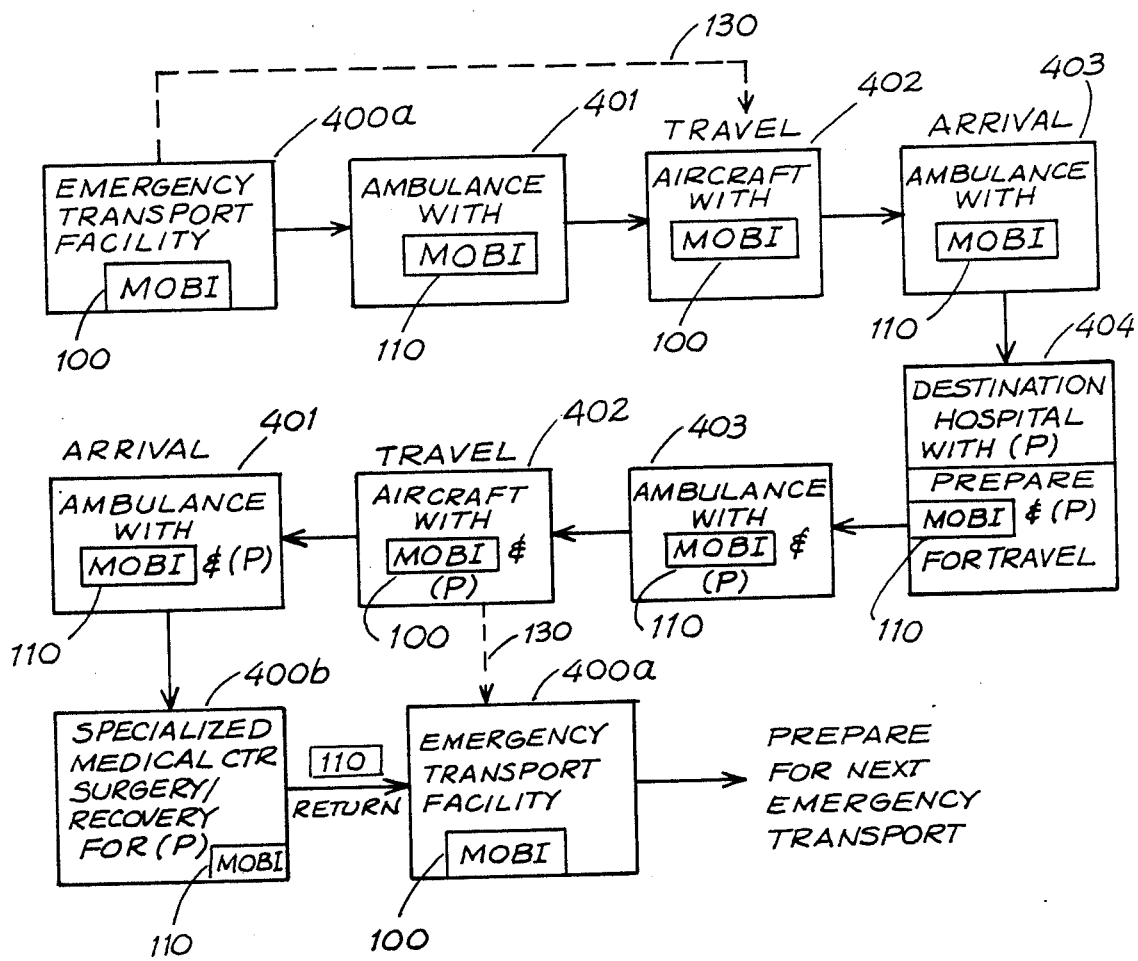
FIG. 14 is a schematic flow of a typical application of the present invention illustrating utilization from an initial requested use to delivery of a patient at a special medical treatment hospital and to return of the apparatus for reuse preparation.

FIG. 14 illustrates in block diagram form the uninterruptable steps in utilizing a stored and functionally operable mobi 100 from an emergency transport facility 400a to a distant hospital 404 having a critically ill patient P and transporting patient P to specialized medical facility 400b. Typically, in this utilization, the pallet means 130 is installed first on aircraft 402 having appropriate seats temporarily removed while a first conventional ground ambulance 401 transports the framework 110 to aircraft 402. The aircraft 402 then transports the mobi 100 to a distant location where a second conventional ground ambulance 403 is waiting to transport the framework means 110 to the hospital 404 where critically ill patient P is waiting to be transported. Once the patient P is stably connected to the life sustaining equipment, then the second ambulance 403 transports the patient P on framework 110 to the ready and waiting aircraft 402. The present transfer methods from the ambulance to the aircraft and vis-a-versa require utilization of physically able personnel, but other mechanical lifting methods, such as a hoist could be utilized. Once the patient and framework are restrained to the pallet means 130 in aircraft 402 then the transporting continues to a location where specialized medical treatment is to be administered, such as a specialized medical hospital 400b, and where, for example, the first conventional ground ambulance 401 is waiting to receive patient P and the framework containing the life sustaining equipment. Once the transfer is executed, then ground ambulance 401 completes the transportation steps by delivering patient P and framework 110 to hospital 400b and the return of the mobi apparatus 100 back to emergency transport facility 400a. It is to be appreciated that throughout the uninterrupted use of the mobi apparatus 100, a staff consisting of a cardiothoracic surgeon, an intensive care unit nurse and respiratory therapist attend to the critically ill patient's medical needs.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus.

We claim:

1. A mobile intensive care patient handling transport apparatus, said apparatus comprising:
   (a) framework means for supporting a critically ill patient in a cot portion and associated life sustaining medical equipment secured in an undercarriage portion of said framework means, said undercarriage portion having restraint bracket attachment members for attaching to a conventional ambulance restraint bracket means provided on conventional ground ambulance vehicles; and
   (b) detachable pallet means for supporting said framework means, said detachable pallet means having first restraint bracket means for detachably securing said framework means to said pallet means utilizing said restraint bracket attachment members, said first restraint bracket means comprising a pallet mounting plate member and a framework undercarriage mounting member, said framework undercarriage mounting member being mechanically coupled to said pallet mounting plate member,
   said detachably secured framework means and said pallet means forming a transportable unit for being transported in an aircraft,
   said detachable pallet means having second restraint bracket means attached to an underside of said pallet means for securing said pallet means to seat rails of said aircraft.

2. A mobile intensive care patient handling transport apparatus, said apparatus comprising:
   (a) framework means for supporting a critically ill patient in a cot portion and associated life sustaining medical equipment secured in an undercarriage portion of said framework means, said undercarriage portion having restraint bracket attachment members for attaching to a conventional ambulance restraint bracket means provided on conventional ground ambulance vehicles;
   (b) life sustaining medical equipment secured to said framework means; and (c) detachable pallet means for supporting said framework means,
   said detachable pallet means having first restraint bracket means for detachably securing said framework means to said pallet means utilizing said restraint bracket attachment members, said detachably secured framework means and said pallet means forming a transportable unit for being transported in an aircraft,
   said detachable pallet means having second restraint bracket means attached to an underside of said pallet means for securing said pallet means to seat rails of said aircraft,
   said pallet means comprising a reinforced, substantially rectangular sheet member, said sheet member having a first mounting hole pattern for mounting said first restraint bracket means to said pallet means and a second hole pattern for mounting said second restraint bracket means to said pallet means, said sheet member being formed by adhesively laminated pair of honeycombed panels having an outer clad material on each face and reinforcing bushings in each hole of said first and second hole patterns.

3. A mobile intensive care patient handling transport apparatus, as recited in claim 2, wherein said first restraint bracket means comprises:
   (a) a pallet mounting plate member; and
   (b) a framework undercarriage mounting member, said framework undercarriage mounting member being mechanically coupled to said pallet mounting plate member.

4. A mobile intensive care patient handling transport apparatus, as recited in claim 2, wherein said second restraint bracket means comprises:
   (a) a mating seat rail restraint member for mechanically mating with said seat reals of said aircraft;
   (b) a fastener means for mechanically coupling said mating seat rail restraint member to said pallet means.

5. A mobile intensive care patient handling transport apparatus, as recited in claim 2, wherein said life sustaining equipment comprising:
   (a) a power source;
   (b) an intra-aortic balloon pump;
   (c) a ventilator;
   (d) a pulse oximeter;
   (e) infusion pumps;
   (f) blood pressure monitors;
   (g) ekg monitors, said intra-aortic balloon pump, ventilator, pulse oximeter, infusion pumps, blood pressure monitors, ekg monitors being electrically coupled to said power source for receiving electrical energy for functioning as life sustaining equipment and being adapted for and provided with back-up electrical stored batteries;
   (h) a pneumatic supply, said pneumatic supply being used to maintain a controlled rhythm for said intra-aortic balloon pump;
   (i) a defibrillator, said defibrillator having an independent high energy power source; and
   (j) patient restraint equipment.

6. A mobile intensive care patient handling transport apparatus, said apparatus comprising:
   (a) framework means for supporting a critically ill patient in a cot portion and associated life sustaining medical equipment secured in an undercarriage portion of said framework means, said undercarriage portion having restraint bracket attachment members for attaching to a conventional ambulance restraint bracket means provided on conventional ground ambulance vehicles;
   (b) life sustaining medical equipment secured to said framework means;
   (c) detachable pallet means for supporting said framework means,
      said detachable pallet means having first restraint bracket means for detachably securing said framework means to said pallet means utilizing said restraint bracket attachment members, said first restraint bracket means comprising a pallet mounting plate member and a framework undercarriage mounting member, said framework undercarriage mounting member being mechanically coupled to said pallet mounting plate member,
      said detachably secured framework means and said pallet means forming a transportable unit for being transported in an aircraft,
      said detachable pallet means having second restraint bracket means attached to an underside of said pallet means for securing said pallet means to seat rails of said aircraft, and
      said detachable pallet means comprising a reinforced, substantially rectangular sheet member, said sheet member having a first mounting hole pattern for mounting said first restraint bracket means to said pallet means and a second hole pattern for mounting said second restraint bracket means to said pallet means, said sheet member being formed by adhesively laminated pair of honeycombed panels having an outer clad material on each face and reinforcing bushings in each hole of said first and second hole patterns.

7. A mobile intensive care patient handling transport apparatus, as recited in claim 6, wherein said second restraint bracket means comprises:
   (a) a mating seat rail restraint member for mechanically mating with said seat rails of said aircraft; and
   (b) a fastener means for mechanically coupling said mating seat rail restraint member to said pallet means.

8. A mobile intensive care patient handling transport apparatus, as recited in claim 6, wherein said life sustaining equipment comprises:
   (a) a power source;
   (b) an intra-aortic balloon pump;
   (c) a ventilator;
   (d) a pulse oximeter;
   (e) infusion pumps;
   (f) blood pressure monitors;
   (g) ekg monitors, said intra-aortic balloon pump, ventilator, pulse oximeter, infusion pumps, blood pressure monitors, ekg monitors being electrically coupled to said power source for receiving electrical energy for functioning as life sustaining equipment and being adapted for and provided with back-up electrical stored batteries;
   (h) a pneumatic supply, said pneumatic supply being used to maintain a controlled rhythm for said intra-aortic balloon pump;
   (i) a defibrillator, said defibrillator having an independent high energy power source; and
   (j) patient restraint equipment.

9. A mobile intensive care patient handling transport apparatus, said apparatus comprising:

(a) framework means for supporting a critically ill patient in a cot portion and associated life sustaining medical equipment secured in an undercarriage portion of said framework means, said undercarriage portion having restraint bracket attachment members for attaching to a conventional ambulance restraint bracket means provided on conventional ground ambulance vehicles, said framework means having welded, heat treated and artificially aged joints, torqued threaded fasteners and reinforcement bracketry that interconnect said cot portion to said undercarriage that conform to emergency landing design requirements comprising of at least 1.5 g. sideward, 2.0 g. upward, 9.0 g. forward and 4.5 g. downward gravitational forces; and (b) detachable pallet means for supporting said framework means, said detachable pallet means having first restraint bracket means for detachably securing said framework means to said pallet means utilizing said restraint bracket attachment members, said detachably secured framework means and said pallet means forming a transportable unit for being transported in an aircraft, said detachable pallet means having second restraint bracket means attached to an underside of said pallet means for securing said pallet means to seat rails of said aircraft, said pallet means comprising a reinforced, substantially rectangular sheet member, said sheet member having a first mounting hole pattern for mounting said first restraint bracket means to said pallet means and a second hole pattern for mounting said second restraint bracket means to said pallet means, said sheet member being formed by adhesively laminated pair of honeycombed panels having an outer clad material on each face and reinforcing bushings in each hole of said first and second hole patterns, said pallet means being structurally designed to conform to emergency landing design requirements comprising of at least 1.5 g. sideward, 2.0 g. upward, 9.0 g. forward and 4.5 g. downward gravitational forces, said framework means and said pallet means being dimensionally sized for complying with said aircraft's cabin size and shape design requirements.

10. A method for providing continuous land and air mobile intensive care for a critically ill patient, such as a cardiac patient, said method comprising the steps of:

(a) providing a mobile intensive care transport apparatus adapted for uninterrupted use in providing said intensive care for said patient, said apparatus comprising:

framework means for supporting said critically ill patient in a cot portion and for containing associated life sustaining medical equipment secured in an undercarriage portion of said framework means, said undercarriage portion having restraint bracket attachment members for attaching to a conventional ambulance restraint bracket means provided on conventional ground ambulance vehicles, and detachable pallet means for supporting said framework means, said detachable pallet means having first restraint bracket means for detachably securing said framework means to said pallet means utilizing said restraint bracket attachment members, said detachably secured framework means and said pallet means forming a transportable unit for being transported in an aircraft, said detachable pallet means having second restraint bracket means attached to an underside of said pallet means for securing said pallet means to seat rails of said aircraft, and said detachable pallet means comprising a reinforced, substantially rectangular sheet member, said sheet member having a first mounting hole pattern for mounting said first restraint bracket means to said pallet means and a second hole pattern for mounting said second restraint bracket means to said pallet means, said sheet member being formed by adhesively laminated pair of honeycombed panels having an outer clad material on each face and reinforcing bushings in each hole of said first and second hole patterns;

(b) placing said critically ill patient onto said cot portion and connecting said life sustaining medical equipment to said patient to provide intensive care;

(c) transporting said patient via land in a first conventional ground ambulance using only said framework means;

(d) attaching said framework means to said detachable pallet means using said first restraint means to form a transportable unit having said patient on said cot portion;

(e) attaching said second restraint means to seat rails of an aircraft;

(f) transporting said transportable unit via air to a remote location without interrupting said life sustaining connection;

(g) detaching said framework means from said pallet means and transferring said patient to a second conventional ground ambulance without interrupting said life sustaining connection; and (h) transferring said patient from said framework means to an intensive care unit in a hospital.

* * * * *